United States Patent [19]
Allen et al.

[11] Patent Number: 5,519,868
[45] Date of Patent: May 21, 1996

[54] COMPILATION OF INFORMATION CONTAINED IN GDMO NAME BINDINGS

[75] Inventors: Wade C. Allen, Durham; Jeremy P. Goodwin, Raleigh; Paul J. Reder, Durham, all of N.C.

[73] Assignee: International Business Machines Corporation, Armonk, N.Y.

[21] Appl. No.: 175,906

[22] Filed: Dec. 30, 1993

[51] Int. Cl.$^6$ .................................. G06F 9/44; G06F 9/45
[52] U.S. Cl. .................. 395/700; 364/280.4; 364/281.3; 364/283.1; 364/283.2; 364/DIG. 1
[58] Field of Search ..................................... 395/200, 500, 395/650, 700, 600; 364/280.4, 281.3, 283.1, 283.2

[56] References Cited

U.S. PATENT DOCUMENTS

| | | | |
|---|---|---|---|
| 5,257,371 | 10/1993 | Anezaki .................................. | 395/650 |
| 5,291,583 | 3/1994 | Bapat .................................... | 395/500 |
| 5,295,256 | 3/1994 | Bapat .................................... | 395/500 |
| 5,313,630 | 5/1994 | Namioka et al. ........................ | 395/600 |
| 5,317,742 | 5/1994 | Bapat .................................... | 395/700 |
| 5,404,532 | 4/1995 | Allen et al. ............................. | 395/700 |
| 5,414,812 | 5/1995 | Filip et al. .............................. | 395/200 |

FOREIGN PATENT DOCUMENTS

| | | | |
|---|---|---|---|
| 0446117A2 | 9/1991 | European Pat. Off. .......... | G06F 9/44 |
| 0446117A3 | 9/1991 | European Pat. Off. .......... | G06F 9/44 |

OTHER PUBLICATIONS

Shih-Kun Huang and Deng-Jyi Chen, "Two-Way Coloring Approaches for Method Dispatching in Object-Oriented Programming Systems", Institute of Computer Science and Information Engineering, Proceedings of the Sixteenth International Computer Software and Applications Conference, Sep. 21, 1992, pp. 39–44.

Yves Caseau, "Efficient Handling of Multiple Inheritance Hierarchies", ACM Sigplan Notices, Proceedings of the 8th Annual ACM Conference on Object–Oriented Programming Systems, Languages, and Applications, OOPSLA 1993, Sigplan Notices, vol. 28, No. 10, Sep. 26, 1993.

*Primary Examiner*—Kevin A. Kriess
*Assistant Examiner*—Dennis M. Butler
*Attorney, Agent, or Firm*—Homer L. Knearl

[57] ABSTRACT

Information on GDMO managed objects, including class hierarchy and the name binding templates, is compiled into a naming table. This naming table is built from an inheritance table and the name binding template information. The inheritance table indicates the inheritance hierarchy of the managed object classes. The compiler builds the inheritance table as a square matrix with a row and column for each class, and the classes arranged in an ordered list from highest to lowest in hierarchy. The compiler enters a one at each position in the inheritance table to indicate that the managed object class in the row inherits from the managed class in the column.

With the inheritance table as a ready reference, the compiler builds the naming table from the name binding templates available as listed in the GDMO source files. The naming table is a square matrix identical to the inheritance table except the entries in the naming table are not ones and zeros. Instead, entries in the naming table are lists of name binding templates that may be used to instantiate a managed object instance in the row class under a managed object instance in the column class.

13 Claims, 13 Drawing Sheets

| MANAGED OBJECT CLASS TEMPLATES | DIRECTORY CLASSES | NAME BINDING TEMPLATES |
|---|---|---|
| TOP<br>A<br>B<br>C<br>M<br>D | ROOT | nb-ROOT-A<br>nb-A-B |

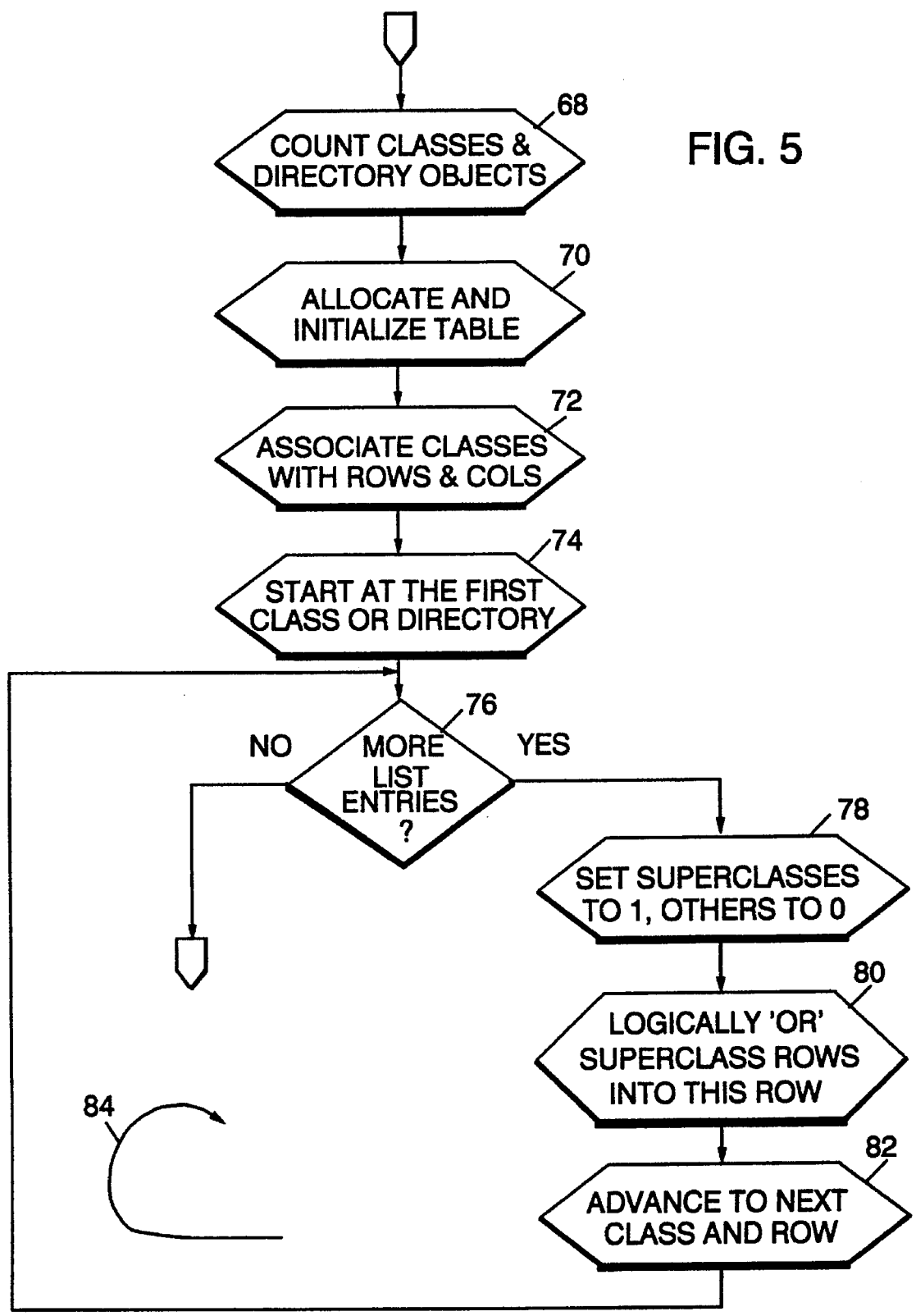

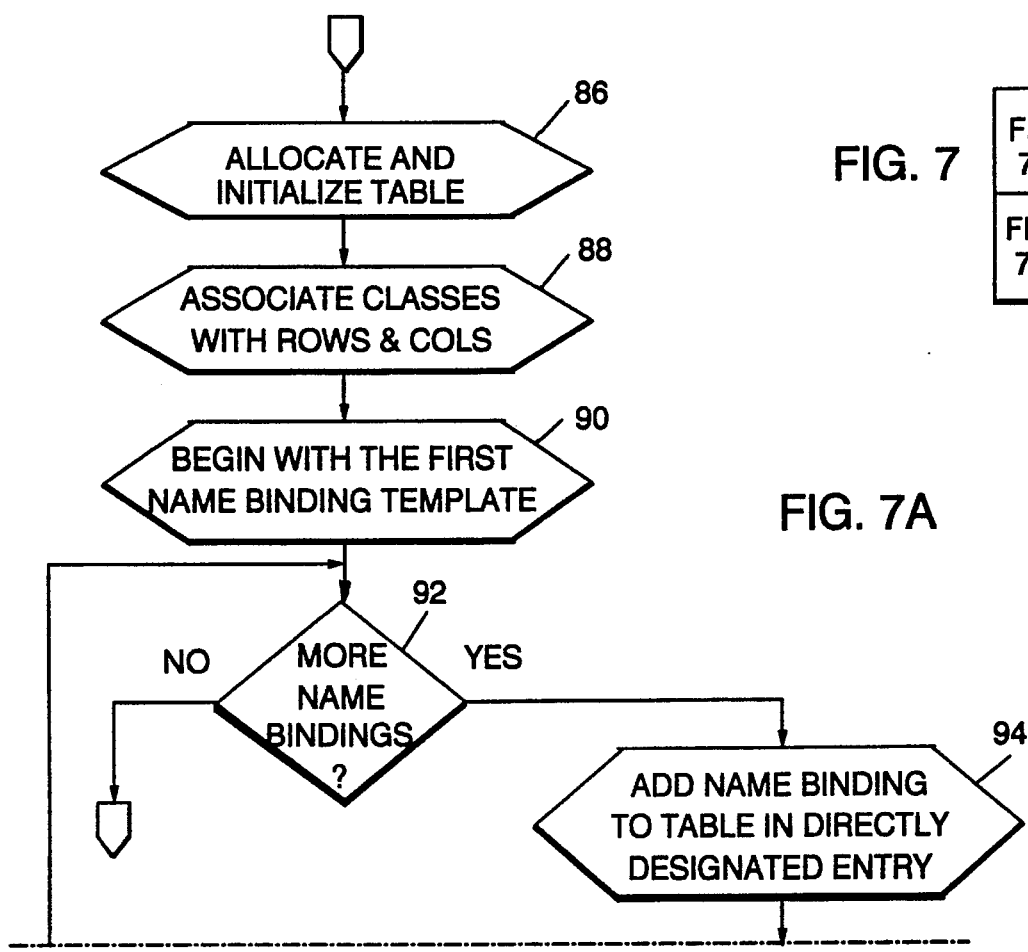

FIG. 13

| | TOP | A | B | C | M | D | ROOT |
|---|---|---|---|---|---|---|---|
| TOP | — | — | — | — | — | — | — |
| A | — | — | — | — | | — | #7 |
| B | — | *7 | — | — | *9 | — | — |
| C | — | *8 | — | — | *10 | — | — |
| M | — | *8 | — | — | *10 | — | #8 |
| D | — | *8 | — | — | *10 | — | — |
| ROOT | — | — | — | — | — | — | — |

FIG. 14 nb-ROOT-A    NAME BINDING
    SUBORDINATE OBJECT CLASS     A AND SUBCLASSES;
    NAMED BY SUPERIOR OBJECT CLASS    ROOT;
    WITH ATTRIBUTE     name;
REGISTERED AS    1.2.3.4.5;

nb-A-B    NAME BINDING
    SUBORDINATE OBJECT CLASS     B AND SUBCLASSES;
    NAMED BY SUPERIOR OBJECT CLASS    A AND SUBCLASSES;
    WITH ATTRIBUTE     name;
REGISTERED AS    1.2.3.4.6;

COMPILATION OF INFORMATION CONTAINED IN GDMO NAME BINDINGS

BACKGROUND OF THE INVENTION

1. Field of the Invention

This invention is directed to providing GDMO (Generic Definition of Managed Objects) name bindings for use in an Opens Systems Interconnection (OSI) system running a Common Management Information Protocol (CMIP) platform. More particularly, the invention relates to building a GDMO naming table for use in a CMIP platform on an OSI system.

2. Description of Prior Art

In OSI management of systems, managed object instances (MOIs), sometimes referred to as instances, managed objects or Just objects, are organized in a relationship tree, called the naming tree. The naming tree represents the naming relationships between MOIs. An instance at a given location in the naming tree is said to be named by its parent in the tree. The naming tree is different from the inheritance hierarchy. A naming tree shows relationships between MOIs, whereas the inheritance hierarchy shows relationships between managed object classes of MOIs. GDMO name binding templates are used to specify the rules which govern managed object instance creation and naming; i.e., the relationships embodied in the naming tree.

Taken together, all of the name binding templates control which MOIs may be named under which other MOIs; i.e., parent-child relationships in the naming tree. Even though the name binding templates govern the naming of MOIs, they control the name in terms of the managed object classes to which each instance belongs. Each naming binding template specifies two classes, with one class being designated as superior, and the other class being designated as subordinate. This superior/subordinate relationship means that an instance of the superior class may be a parent of an instance of the subordinate class in the naming tree.

For example, suppose a name binding template specifies that MOIs of a class "X" are superior to instances of another class "Y" in the naming tree. Then, when an instance of class Y is created, it is created under an instance of class X in the naming tree. Another name binding template may specify Y as subordinate to a third class "Z." In such a situation, when creating an instance of Y, there would be a choice of creating the Y instance under any instance of X or any instance of Z. A generic system which can handle an arbitrary number of classes and name binding templates, and which supports the full range of instantiation alternatives (bringing instances to life) is thus quite complicated.

The problem of creating instances with the proper relationship in the naming tree is significantly complicated further by an option in the OSI standard. This option is the "AND SUBCLASSES" attribute which may be specified in the name binding template. The AND SUBCLASSES attribute may be specified for either the superior or subordinate class of MOIs. If the AND SUBCLASSES attribute is present in the name binding template on the superior class, then instances of the subordinate class may be named under instances of the superior class, or instances of any class which is a subclass of the superior class. Likewise, if the AND SUBCLASSES attribute is present on the subordinate class in a name binding template, then instances of the subordinate class, and instances of any subclass of the subordinate class may be named under instances of the superior class. When AND SUBCLASSES is specified for both the superior and subordinate classes, the set of instantiation combinations permitted grows dramatically. This occurs rather often—systems using the OSI standard, and non-standards, use the AND SUBCLASSES attribute frequently.

SUMMARY OF THE INVENTION

It is an object of this invention to provide full support for managed object instantiation with name binding templates, even though there are complex instantiation alternatives specified in the templates.

It is a further object of this invention to allow all of the instantiation alternatives specified by a large set of templates, while preventing the creation of instances that are not allowed.

In accordance with this invention, the above objects are accomplished by compiling the managed object classes information, the name binding list of templates and the name binding template information into a naming table. This naming table is built from an inheritance table, and the name binding template information. The inheritance table indicates the inheritance hierarchy of the managed object classes. The compiler builds the inheritance table as a square matrix with a row and column for each class, and the classes arranged in an ordered list from highest to lowest in hierarchy. In the ordered list, a subordinate class that inherits from a superior class, must be at a lower position than the superior class in the ordered list. The compiler enters a one at each position in the inheritance table to indicate that the managed object class in the row inherits from the managed class in the column.

With the inheritance table as a ready reference, the compiler builds the naming table from the name binding templates available, as listed in the GDMO source files. The naming table is a square matrix identical to the inheritance table, except the entries in the naming table are not ones and zeros. Instead, entries in the naming table are lists of name binding templates that may be used to instantiate a managed object instance in the row class under a managed object instance in the column class. The list at each row and column may contain more than one named template. Most entries in the naming table will be empty. The compiler places an entry in a location of the table for each listed name binding template based on a class row indicating the subordinate class, and a class column indicating the superior class. The compiler also examines each listed name binding template, and places additional entries in the naming table for AND SUBCLASSES, as specified by the template for the subordinate class, the superior class or both. A program, such as the CMIP program, may use the naming table to quickly identify the instantiation alternative choices when requested to create a managed object instance.

As an additional feature of the invention, the naming table may be converted into a sparse table or file. This naming output file only has entries for non-empty locations in the naming table. Further, the naming output file may be packaged in a manner for easy loading into the program using the naming output file.

Another feature of the invention is that the CMIP infrastructure, or any program wishing to instantiate a managed object instance, is relieved of all of the calculations associated with the instantiation alternatives for the object being brought to life. Instead, the CMIP platform uses the naming table, built by the GDMO compiler in accordance with this invention, to choose an instantiation alternative.

One great advantage of the invention is that changes in the GDMO may be incorporated into the GDMO table supplied to the CMIP infrastructure rather than requiring a recompile of the infrastructure. Other objects, advantages and features of the invention will be understood by those of ordinary skill in the art after referring to the complete written description of the preferred embodiments in conjunction with the following drawings.

BRIEF DESCRIPTION OF THE DRAWINGS

FIG. 5 illustrates the logical operations performed to build the inheritance table as called for by operation 62 in FIG. 2.

FIG. 6 shows the inheritance table built by the operations in FIG. 5.

FIG. 7, which is split into FIGS. 7A and 7B, illustrates the operations for building the naming table per operation 64 in FIG. 2.

FIG. 13 shows a naming table produced from the example inputs in FIGS. 3, 4 and 14.

FIG. 14 shows the name binding templates listed in FIG. 4.

DESCRIPTION OF THE PREFERRED EMBODIMENTS

Figure 1:
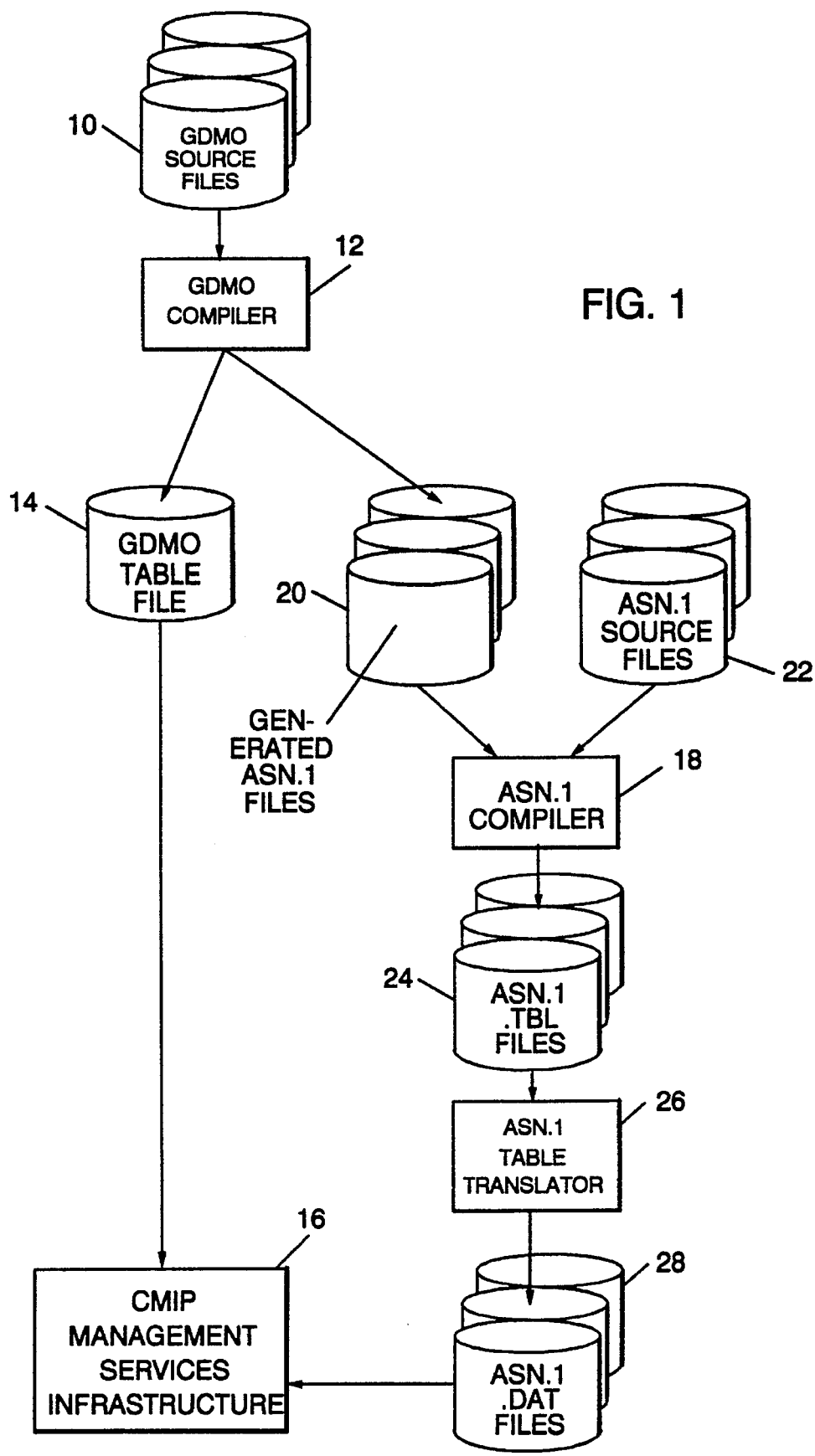
FIG. 1 shows a GDMO compiler and an ASN.1 compiler providing the GDMO table file, and ASN.1.DAT files to define managed objects to a CMIP management services infrastructure.

In FIG. 1, the data flow for a system operating in accordance with the invention to build and output the GDMO naming table to the CMIP management services infrastructure. The naming templates supplied from the GDMO source files 10 are provided to the GDMO compiler 12. The GDMO compiler 12 builds, and outputs the GDMO table file 14, which is loaded into the CMIP infrastructure 16.

In addition to the GDMO language, the ASN.1 (Abstract Syntax Notation 1) language is used with GDMO language to define managed objects, and the syntax of the protocol flows that go between the managed objects. The GDMO language is specified in *CCITT Recommendation X.722* (1992) or *ISO/IEC* 10165-4:1992, "Information Technology—Open Systems Interconnection—Management Information Services—Structure of Management Information: Guidelines for the Definition of Managed Objects." The ASN.1 language is specified in *CCITT Recommendation X.208* (1988), "Specification of Abstract Syntax Notation One (ASN.1)" or in ISO 8824:1987, "Information Processing Systems—Open Systems Interconnection—Specification of Abstract Syntax Notation One (ASN.1)."

A feature of the ASN.1 language is "ANY DEFINED BY." To resolve information provided by this feature and output it to the CMIP infrastructure, the information from the GDMO compiler 12 must be compiled by the ASN.1 compiler 18. The GDMO compiler 12 generates the ASN.1 information files 20, which are used with the ASN.1 source files 22 by the ASN.1 compiler, to build the ASN.1.TBL files 24. These table files are translated by table translator 26 to produce the ASN.1.DAT data files 28. These data files are loaded, along with the GDMO table file 14, into the CMIP infrastructure to define the managed objects and the protocol flow between managed objects.

Figure 2:
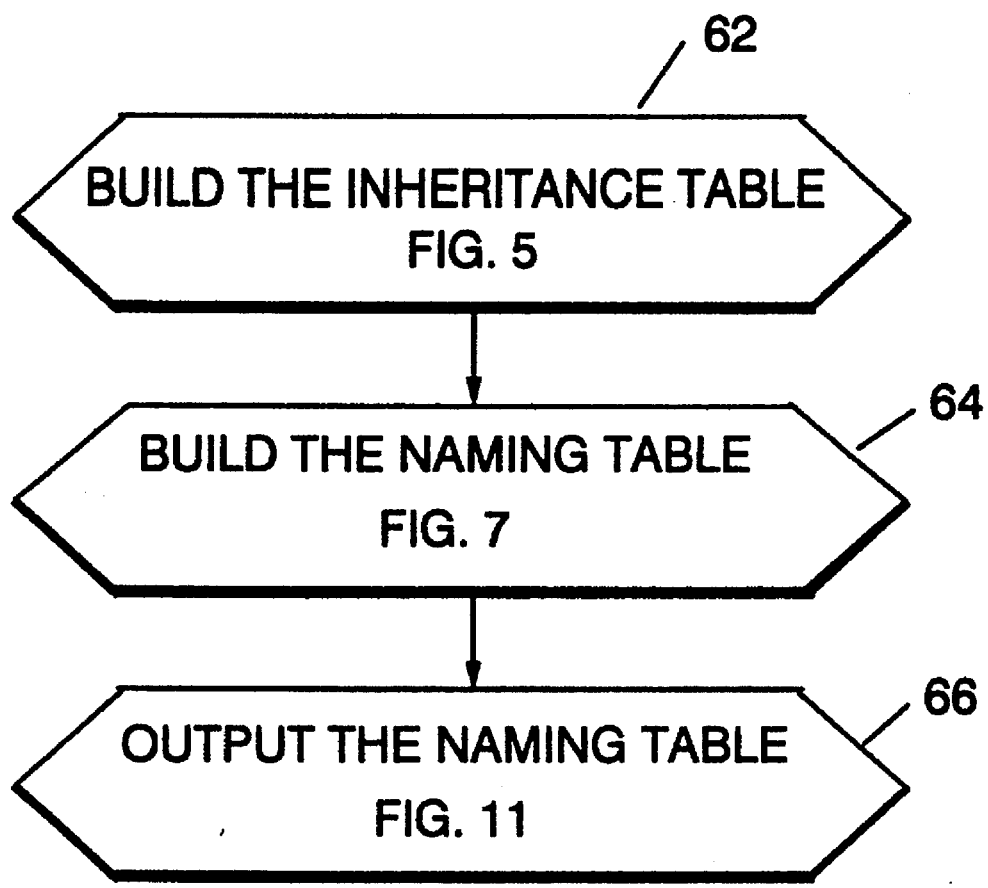
FIG. 2 shows the logical operations performed by the GDMO compiler of FIG. 1 in accordance with the preferred embodiment of the invention.

FIG. 2 illustrates the preferred embodiment of the invention implementing the GDMO compiler of FIG. 1. There are three basic operations to be performed. First, the GDMO compiler, at step 62, builds the inheritance table. The details of the inheritance table building operation are shown in FIG. 5, and an example of an inheritance table is shown in FIG. 6. Second, the GDMO compiler, at step 64, uses the inheritance table to build the naming table. An example of a naming table is shown in FIG. 13, and the operations for building the naming table are detailed in FIG. 7. Finally, the GDMO compiler, at step 66, outputs the naming table as a sparse naming table to the CMIP infrastructure. The sparse naming table is the naming table condensed to contain only the significant information; i.e., the sparse table only includes entries in the naming table that were non-zero. The output operations are detailed in FIG. 11.

Figures 3, 4:
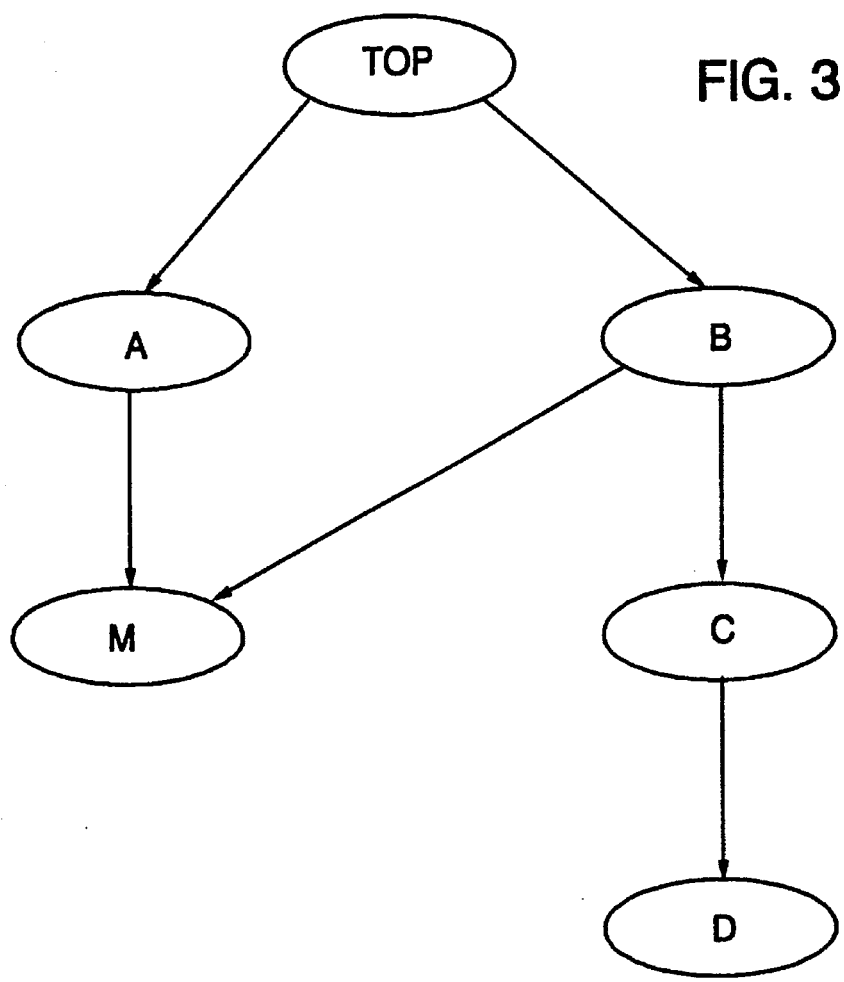
FIG. 3 shows an example of a managed object class inheritance hierarchy that will be used to illustrate the operation of the invention.
FIG. 4 is an example of a list of the managed object class templates, a directory object class and the list of name binding templates that are input to the GDMO compiler and converted to a naming table by the present invention.

To illustrate the operation of the invention, an example of managed object classes, which are organized by inheritance hierarchy as shown in FIG. 3, will be used. In this hierarchy, there are six managed object classes. The highest class is "TOP," and under TOP there are subordinate classes "A" and "B" having subordinate classes "M" and "M, C, D", respectively. Between two classes connected in the hierarchy, one will be superior and the other subordinate. For example, B is superior to C, and C is subordinate to B. Note that a class may be subordinate to more than one superior class; M is subordinate to both A and B.

A subordinate class has all attributes of the superior class it is subordinate to. Thus, C has all the attributes of B plus more. It can be said that C is like a B. For example, B might be a class for object class printers, and C might be a subordinate class for laser printers. Therefore, B has certain attributes for printers, in general, and C has those attributes, plus additional attributes for laser printers.

In addition to the hierarchy of classes in FIG. 3, the example being used to illustrate the invention includes, as shown in FIG. 4, the six managed object classes from FIG. 3, one directory object—"ROOT"—and two name binding templates. ROOT refers to the root directory which is also treated as a managed object instance, except that the ROOT directory object exists as a starting point. The ROOT is not instantiated like other managed object instances. The managed object classes are listed in the left column in FIG. 4 by hierarchy. Accordingly, class M is listed higher than class D. In the right column, there are name binding templates; i.e., rules for naming objects. There is a name binding template named "nb-ROOT-A", and a second name binding template named "nb-A-B." In each case, nb stands for name binding. The phrase "ROOT-A" indicates that managed object instances of A can be named under managed object instances of ROOT; likewise, "A-B" indicates that MOIs of B can be named under MOIs of A. Note that under the naming rule in this example, B is under A in a naming tree, while in the inheritance hierarchy in FIG. 3, A and B are peers. Under the OSI standards, the name binding hierarchy is not the same as the inheritance hierarchy.

In FIG. 5, the logical operations for building an inheritance table tree begin with operation 68. Operation 68 counts the classes and directory objects. In the example from FIGS. 3 and 4, there are six managed object classes, and one directory object. For purposes of naming objects, the directory object gets handled similarly to managed objects, except a directory object is not instantiated; it already exists. The count in the example is seven.

Operation 70 allocates storage locations for the inheritance table, and initializes a table having seven rows and seven columns, one for each class and directory object in FIG. 4, with each entry in the table initialized to zero. Operation 72 then associates the classes and directory object with the rows in columns, as shown in FIG. 6. The rows and columns are ordered top to bottom and left to right, in accordance with the ordered list of classes, plus the ROOT directory object in FIG. 4. Note that the list is ordered per FIG. 3, so that a parent, or superior, class always comes before a child or subordinate class. The ROOT object is not in the hierarchy of managed object classes so it can be put anywhere in the ordered list; it has been placed at the end of the rows and columns in the table of FIG. 6.

The compiler, at step 74, starts at the first class or directory. In the example, the compiler starts at class TOP. Decision operation 76 tests for more entries in the ordered list of classes and directory objects. Since there are more entries, the process branches to operation 78. Operation 78 looks for superclasses (classes immediately superior) to TOP. If it finds any superclasses, it sets the column entry for those superclasses in the TOP row to one. Since TOP is the most superior class, there will be no superclasses, and all entries in row TOP are set to zero. Operation 80 then logically ORs superclass rows into the current row. The current row is TOP, and there are no superclass rows, so row TOP remains all zeros. Operation 82 indexes the process to the next class; i.e., the next row in the table of FIG. 6.

Loop 84, through operations 76, 78, 80, and 82, continues processing each row in the table of FIG. 6. In class A row, there is a superclass TOP, so a one is entered in the TOP column by step 78. Step 80 then ORs the TOP row with the A row, as TOP is A's superclass row. Since the TOP row is all zeros, the A row is unchanged. In the next pass through loop 84, the same result is obtained for class B row. In class C row, B is the superclass, so operation 78 sets a one in the B column of the C row. Step 80 then ORs the superclass row B with row C; this results in ones being entered at columns TOP and B in row C. In row M, operation 78 detects two superclasses, A and B; therefore, columns A and B are set to one in row M. Operation 80 then logically ORs rows A, B and M, which results in ones being entered in columns TOP, A and B of row M. Another pass through loop 84 processes class D, and enters ones in columns TOP, B and C for row D.

After row D, the ROOT object is processed in the loop as next entry in the ordered list. Since ROOT has no superclasses, all entries in row ROOT will be zero. After ROOT, decision 76 detects there are no more entries in the ordered list. The process branches NO, and returns to FIG. 2. The inheritance table has been built, and the compiler is ready for operation 64 in FIG. 2, which builds the naming table.

Figure 7B:
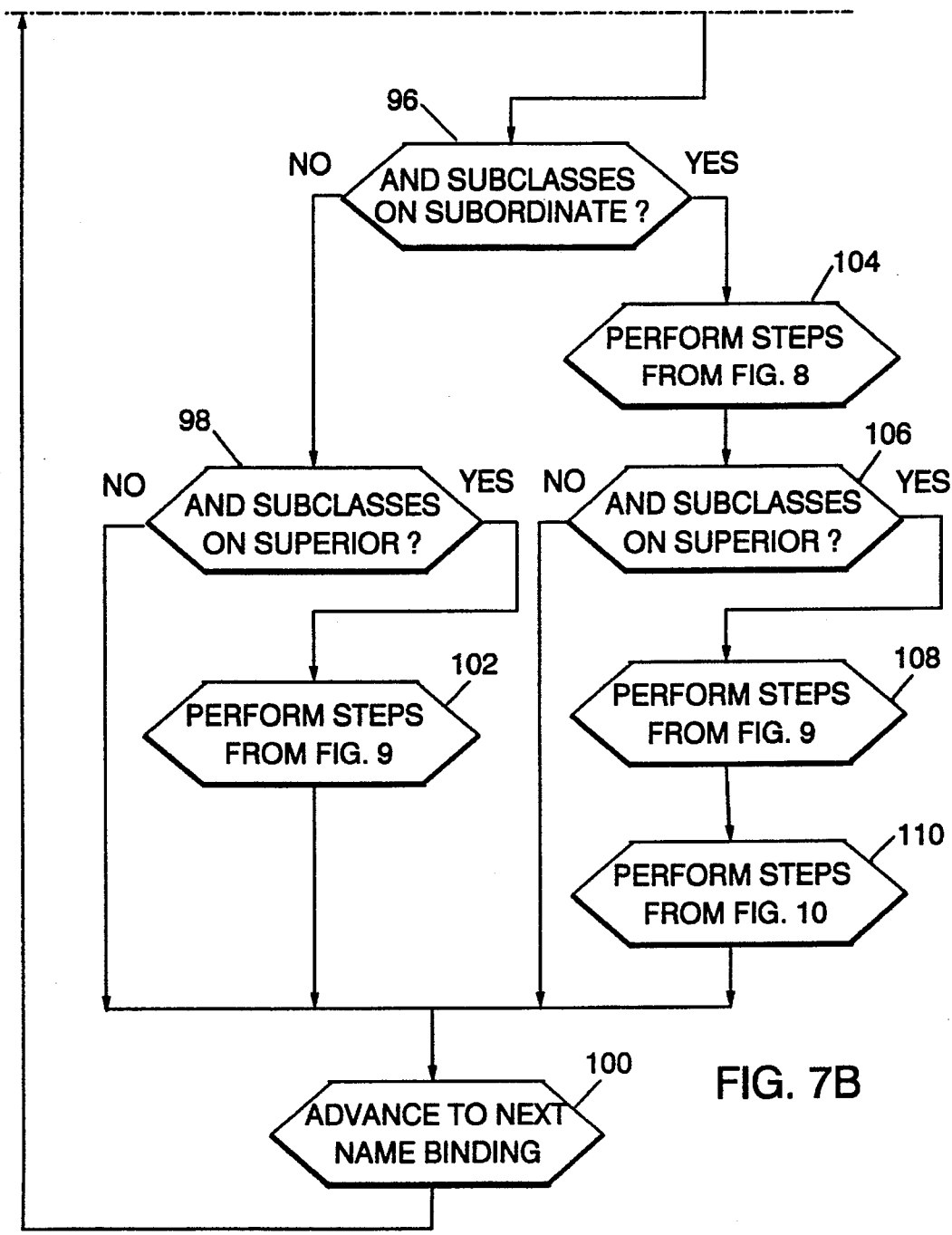

The operations for building the naming table are shown in FIG. 7 which is divided into FIGS. 7A and 7B. The process begins at step 86 by allocating dynamic storage space initializing a seven-by-seven matrix (naming table in this example) with each entry set to zero. Operation 88 then associates the rows and columns with the ordered list, including directory objects, so that the naming table in FIG. 13 looks like the inheritance table in FIG. 6.

The determination of entries in the naming table begins with step 90 that retrieves the first name binding template from the GDMO source files. In the example of FIG. 4, the first name binding template is "nb-ROOT-A," and the second name binding template is "nb-A-B." The contents of these two name binding templates are shown in FIG. 14. Decision operation 92 tests to see if a name binding template was retrieved. Since step 90 did retrieve a template, the answer is YES, and the process branches to operation 94.

The entries in the naming table are different in character from the entries in the inheritance table. In the inheritance table, each entry is simply a one or a zero. In the naming table, each entry, if it is not empty, is a list of name binding templates. A given row/column location in the naming table indicates that instances of the class associated with the row may be instantiated under instances of the class associated with the column using the name binding templates in the list at that row/column location.

In operation 94, the compiler adds the name binding to the list at the directly designated entry. In the case of name binding ROOT-A, the direct entry is at row A, column ROOT. The entry is a pointer to a data storage location containing the information from the name binding template. The rest of the process in FIG. 7 is testing for whether the name binding template contains "AND SUBCLASSES" attributes on the superior class, the subordinate class or both, and then processing the template accordingly to make additional entries in the naming table. Decision operation 96 detects if the AND SUBCLASSES attribute is on the subordinate. If it is not, the logical operations branch to decision operation 98. Operation 98 detects whether the AND SUBCLASSES is on the superior class. If it is not, there are no further entries to be made for that template on the naming table, and the process branches to step 100 to get the next name binding template. This is the simplest path through the process loop in FIG. 7, and the path equates to no AND SUBCLASSES attributes in the name binding template.

Figure 9:
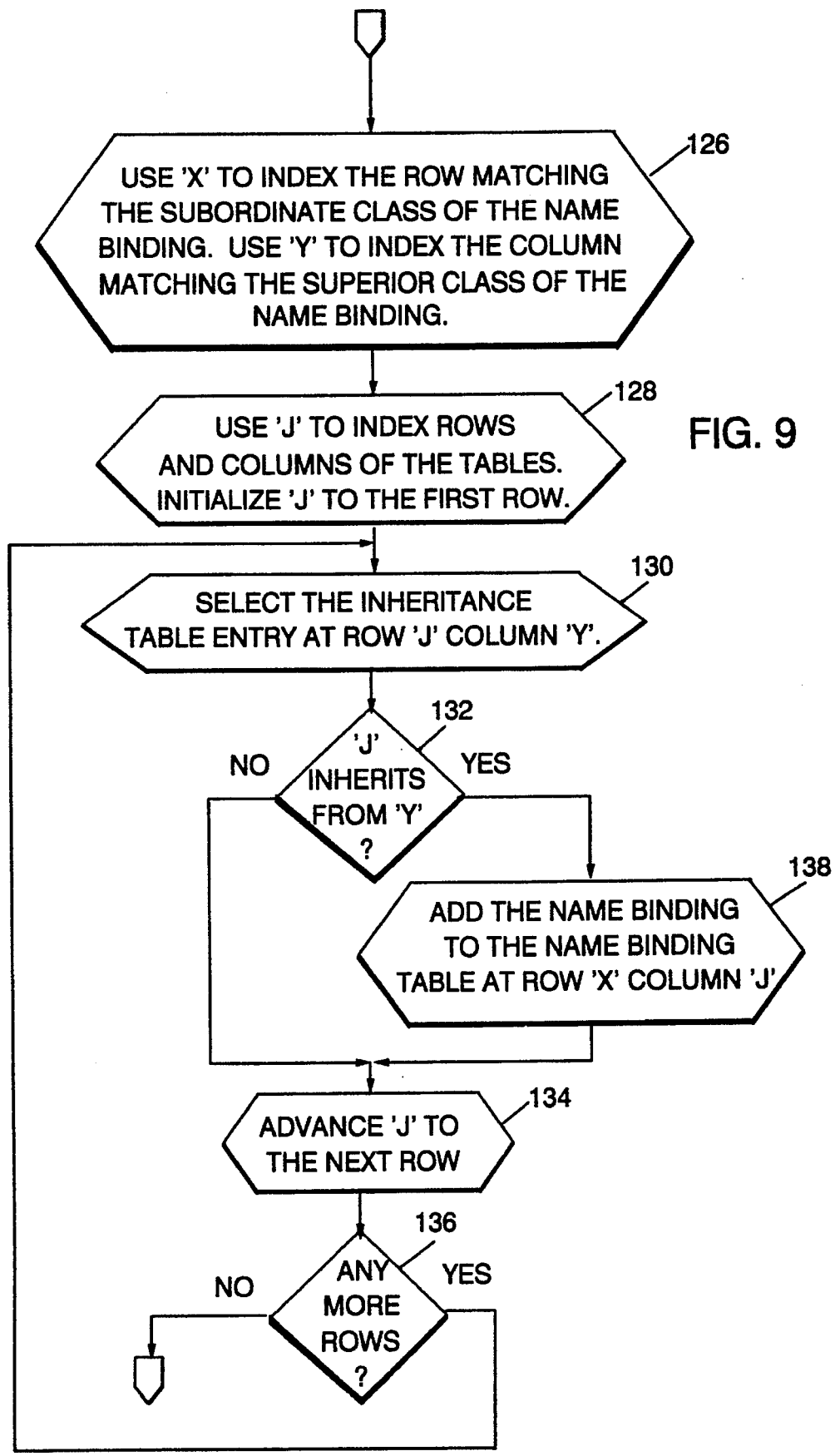
FIG. 9 illustrates the details of making entries in the naming table when the AND SUBCLASSES option is specified in the name binding template for the subordinate object class.

If the name binding template has no AND SUBCLASSES attribute on the subordinate class, but does have an AND SUBCLASSES attribute on the superior class, the path proceeds from operation 94, to decision 96, to decision 98, to operation 102, to operation 100. Operation 102 processes the AND SUBCLASSES attribute on the superior class to add appropriate additional entries in the naming table. Operation 102 is shown in FIG. 9, and will be described hereinafter.

If the name binding template has an AND SUBCLASSES attribute on the subordinate class, and no AND SUBCLASSES attribute on the superior class, the path through FIG. 7 proceeds from operation 94, to decision 96, to operation 104, to decision 106, to operation 100. Operation 104 processes the AND SUBCLASSES on the subordinate to add appropriate additional entries in the naming table. Operation 104 is shown in FIG. 8, and will be described hereinafter.

Figures 10, 10A:
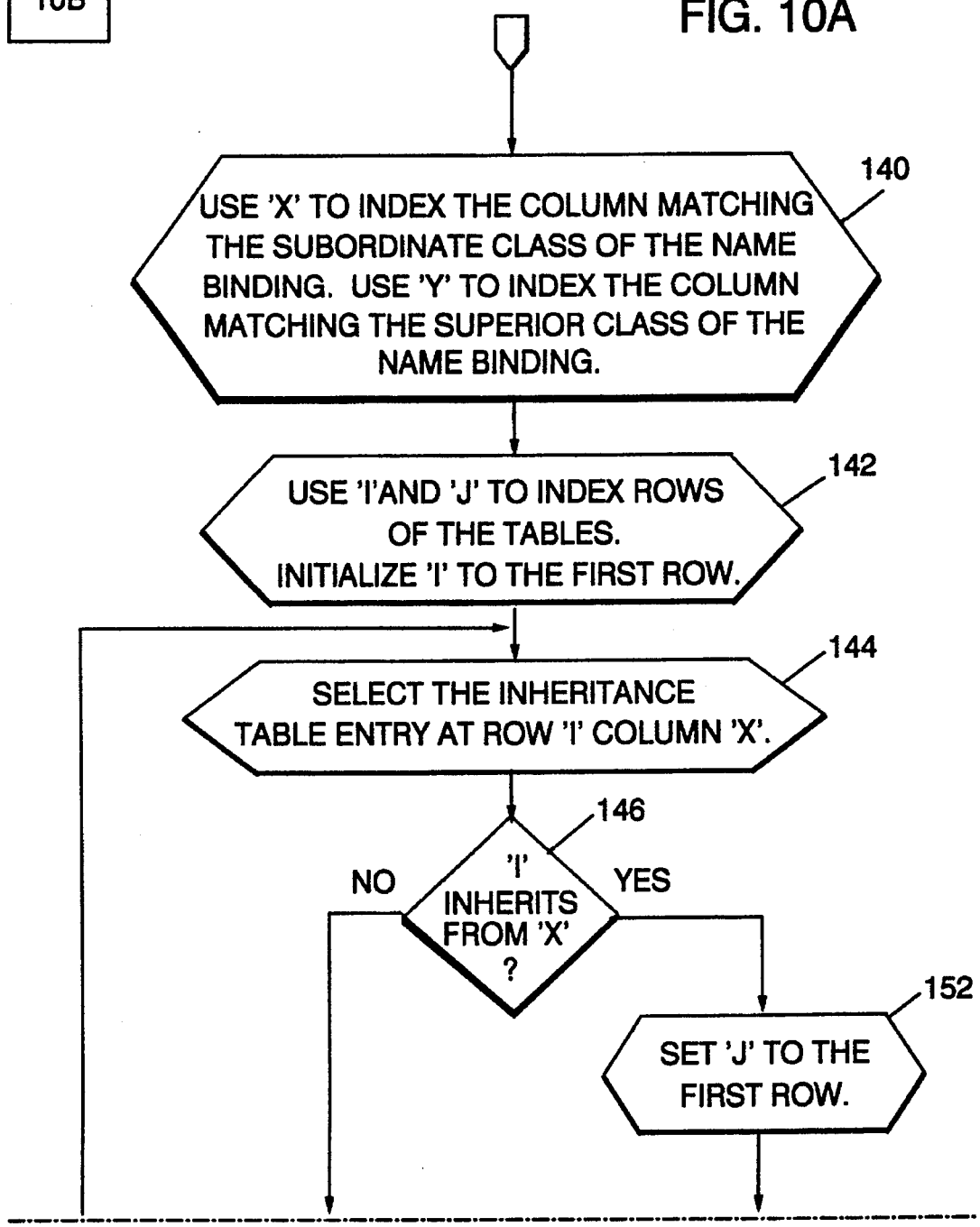
FIG. 10, which is split into
FIGS. 10A and 10B, illustrates the details of making additional entries in the naming table when the AND SUBCLASSES option is specified for both the subordinate and superior classes.

If the name binding template has an AND SUBCLASSES attribute on the subordinate class, and an AND SUBCLASSES attribute on the superior class, the path through FIG. 7 proceeds from operation 94, to decision 96, to operation 104, to decision 106, to operation 108, to operation 110, to operation 100. Operation 104 processes the AND SUBCLASSES on the subordinate object class to add appropriate additional entries in the naming table. Operation 108 processes the AND SUBCLASSES attribute on the superior object class to add appropriate additional entries in the naming table. Operation 110 processes the AND SUBCLASSES attribute on both the subordinate and superior object classes to add appropriate additional entries in the naming table. Operation 110 is shown in FIG. 10, and will be described hereinafter.

Returning to the example of name binding template, nb-ROOT-A in FIG. 14, the template indicates the subordinate object class is "A AND SUBCLASSES." In this first name binding template, there is an AND SUBCLASSES attribute on the subordinate. Accordingly, the process in FIG. 7 branches from decision operation 96 to operation 104 which is performed in FIG. 8.

Figure 8:
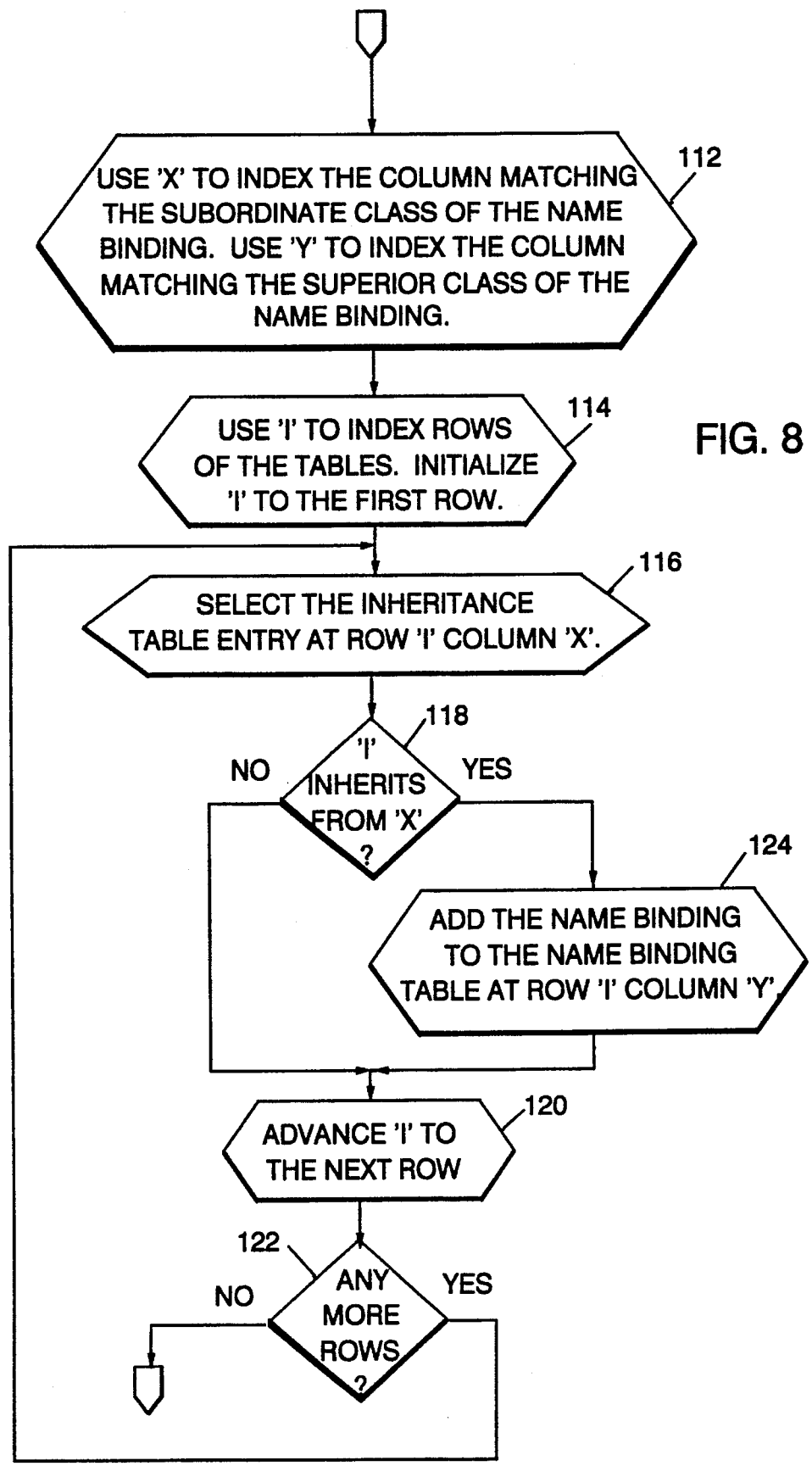
FIG. 8 illustrates the details of making entries in the naming table when the AND SUBCLASSES option is specified in the name bind template for the superior class only.

In FIG. 8, the subroutine begins in operations 112 and 114 by assigning indexes for the subroutine. Variable X is used to index the column matching the subordinate class of the name binding, and Y is used to index the column matching the superior class of the name binding. Variable "I" is assigned in operation 114, and is used to index rows of the tables. Operation 114 also initializes "I" to the first row "TOP." Note that columns represent "parents", and rows represent children; in other words, an instance in a row class is instantiated under an instance in a column class.

The process loop in FIG. 8 then begins at step 116 by selecting from the inheritance table (FIG. 6) the entry at row "I" column X. In the example, "I" starts at TOP and X equals A, the subordinate class specified in template nb-ROOT-A (FIG. 14). Thus, the entry select from the inheritance table is row TOP column A which contains a zero. Decision 118 then detects whether "I" inherits from X; i.e., does TOP inherit from A, or is the TOP/A entry in the inheritance table a one? The answer is NO, and the process branches to operation 120. Operation 120 indexes "I" to the next row in the tables which is A. Decision operation 122 tests whether there are any more rows. Since the answer is yes, the process loops back to operation 116 and processes the class A row.

The program loop in FIG. 8 continues and, in each loop, the program asks the question does the indexed class row inherit from class A. The answer is NO until class M row. At row M column A there is a one in the inheritance table indicating class M does inherit from class A. Accordingly, at this condition, decision 120 branches the process YES to operation 124. Operation 124 adds a pointer to the name binding template to the list at entry row M column ROOT in the naming table in FIG. 13. This is the only additional entry produced for name binding template nb-ROOT-A by the process in FIG. 8. Classes D and ROOT do not inherit from A and, during the last loop through the FIG. 8 subroutine, decision 122 detects no more rows in the tables, and returns the process flow to FIG. 7. In FIG. 7, decision 104 then tests whether the template nb-ROOT-A has an AND SUBCLASSES attribute on the superior class. From FIG. 14, the answer is NO, and the process branches to operation 100 to get the next name binding template.

The naming table in FIG. 13 is now complete for template nb-ROOT-A. In effect, the naming table can now tell a using program that an instance of A or M can be created under the directory object ROOT. In FIG. 13, a coding convention is used for the entries in the table to indicate how the entries were created. The "#" indicates the source of the entry is the name binding template nb-ROOT-A, and the "*" indicates the source of the entry is the name binding template nb-A-B. The numeral after the # or the * indicates the number of the FIGURE showing the subroutine that made the entry in the table. Accordingly, the entry at row M, column ROOT, is due to template nb-ROOT-A, and was made by the subroutine in FIG. 8. Likewise, the entry at row B, column M, in the naming table is due to template nb-A-B, and was made by the subroutine in FIG. 9.

The next name binding template retrieved by operation 100 in FIG. 7 is nb-A-B, and is shown in FIG. 14. This name binding template has the AND SUBCLASSES attribute for both the subordinate class and the superior class. In FIG. 7A, operation 94 makes the direct entry. In this template, B is the subordinate class and A is the superior class.

Accordingly, the direct entry is at class B row under column A indicating instances of B can be named under instances of A using the nb-A-B template pointed to by the pointer now entered at the B/A location of the naming table.

Decision 96 then tests for whether there is an AND SUBCLASSES attribute on the subordinate. The answer is Yes, and the process branches to subroutine in FIG. 8 described above. The result of the subroutine process in FIG. 8 is to place a pointer to the template nb-A-B in rows for classes C, M and D under column A. The subroutine in FIG. 8 detects from the inheritance table that classes C, M and D all inherit from B. Therefore, since B is subordinate to A, an entry pointing to template nb-A-B is added in the A column in the naming table at rows C, M and D.

After the process in FIG. 8, the compiler returns to decision operation 106 in FIG. 7B. Decision 106 detects that the AND SUBCLASSES attribute is set for the superior class A in the template nb-A-B (FIG. 14). This says that instances of B can be named under instances of A and its SUBCLASSES. To determine these possible naming entries, the process branches to operation 108, shown in detail in FIG. 9. The operation in FIG. 9 is looking for possible entries in the B row of the naming tree.

The subroutine in FIG. 9 begins at step 126 by assigning indexes "X" and "Y" to be used in the subroutine. Variable "X" is used to index the row matching the subordinate class of the name binding template. The subordinate class is B in this example. Variable "Y" is used to index the column matching the superior class of the name binding template.

The superior class is A. The compiler, at step 128, assigns the index variable "J" to index rows and columns, and initializes "J" to the first row; in this example, the first row is TOP.

The loop in subroutine of FIG. 9 begins at step 130 by selecting from the inheritance table (FIG. 6) the entry at row TOP column A, since J is TOP and Y is A in our example. Decision operation 132 detects whether TOP inherits from Y, i.e., is the TOP/A entry equal to one? As determined from the inheritance table, the answer is NO, so the loop branches to operation 134. Operation 134 indexes J to the next row which is A. Decision operation 136 asks whether there are any more rows in the tables. The answer is YES, so the process returns to operation 130 to select the entry from location A/A in the inheritance table. This loop continues until row M.

During the loop for row M, decision operation 132 detects that M does inherit from A. From operation 132, the process branches to operation 138. Operation 138 now adds the pointer for the name binding template to the list at location row X column J in the naming table. Note that J, in operation 138, now specifies a column rather than a row. As a result, the pointer is added as an entry at class B row and class M column. In effect, the loop in the subroutine of FIG. 9 is looking for all the subclasses of A in the inheritance table. When it finds such a subclass, the subroutine then adds, at that subclass column, an entry in the B row in the naming table. This is true because the nb-A-B template says instances of B may be instantiated under A and its subclasses, and M is a subclass of A.

After operation 138, J as a row again is indexed by operation 134 to the next row, and loops back to operation 130. There are no more ones in the A column of the inheritance table, so after the ROOT row, decision operation 136 branches the process NO. The FIG. 9 subroutine is finished, and the compiler process returns to FIG. 7B. The next operation in FIG. 7B is operation 110 which is detailed in FIG. 10.

FIG. 10 is the subroutine for handling instances of subclasses of B named under subclasses of A, which is only M in this example. This is required because the template nb-A-B in FIG. 14 specifies both superior and subordinate classes with AND SUBCLASSES. M is a subclass of superior class A and, therefore, subclasses of subordinate class B can be instantiated under M, even though M is also a subclass of B.

Figure 10B:
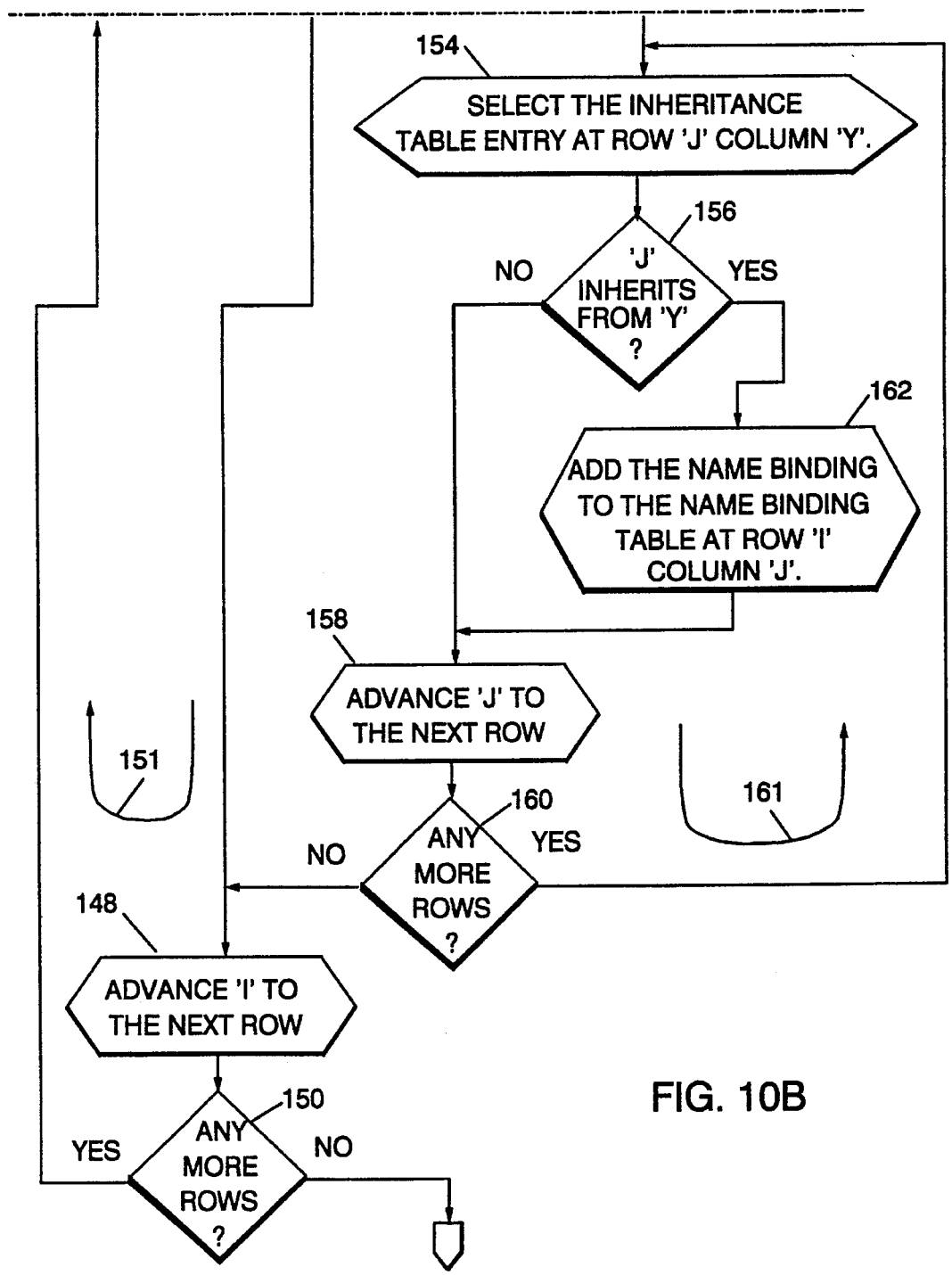

FIG. 10 is divided into FIGS. 10A and 10B. In FIG. 10A, the compiler, at step 140, assigns indices "X" and "Y." X is used to index the column matching the subordinate class of the template; in this example, X is class B. Y is used to index the column matching the superior class of the template; in this example, Y is class A. Operation 142 sets indices "I" and "J" to index rows of the tables, and initializes "I" to the first row; i.e., TOP.

The loop in the subroutine begins at step 144 where the compiler selects the entry for the inheritance table (FIG. 6) at row "I" column X. In this example, for the template nb-A-B, "I" is TOP and X is B. Thus, the entry at TOP/B from the inheritance table is zero. Accordingly, decision operation 146 detects that TOP does not inherit from B, and the process branches NO to operation 148 in FIG. 10B.

Operation 148 indexes "I" to the next row which is A. Decision operation 150 tests for more rows, and since the answer is YES returns the process to operation 144 in FIG. 10A.

The loop 151 through operation 144, decision 146, operation 148 and decision 150 continues until there are no more rows or until the class of the indexed row does inherit from class B. Looking at column B in the inheritance table, decision operation 146 will branch Yes to operation 152 for each of the classes C, M and D. In operation 152, index J is set to the first row; i.e., TOP. The process passes to operation 154 which begins a J indexing loop with the "I" indexing loop.

Operation 154 selects from the inheritance table the entry at row J column Y which, in this example, is location TOP/A. The entry at this location is zero, so decision operation 156 detects NO inheritance, and branches to operation 158. Operation 158 indexes J to the next row which is A, and decision operation 160 tests for more rows. Since the answer is YES, the process returns to operation 154. The process loop 161 through operation 154, decision 156, operation 158 and decision 160 continues until there are no more rows, or until a class inherits from A.

From column A in the inheritance table, the class rows, as indexed with J, will result in decision operation 156 detecting an inheritance from A only at class M row. When decision operation 156 detects the inheritance at location M/A in the inheritance table, it branches the process to operation 162. Operation 162 adds the pointer to the name binding template nb-A-B to the entry at row "I" column J of the naming table.

Briefly, in summary for the example, "I" is indexed in loop 151 until class C row is reached. At class C row, the process branches to loop 161, and J is indexed until class M row is reached. At that point, operation 162 adds the pointer to template nb-A-B at row C column M of the naming table in FIG. 13. J is indexed in loop 161 through the last row. "I" is indexed in loop 151 to class M row, and the process again branches to loop 161. J is indexed again to class M row, and operation 162 adds a pointer to nb-A-B at row M column M of the naming table. Again, J is indexed in loop 161 through the last row. "I" is then indexed in loop 151 to class D row, and the process again branches to loop 161. J is indexed again to class M row, and operation 162 adds a pointer to nb-A-B at row D column M of the naming table. J is indexed through the ROOT row, "I" is then indexed through the ROOT row and after the ROOT row is processed, decision operation 150 in FIG. 10B detects there are no more rows. The process then returns to FIG. 7B.

The naming table is now complete. For the example inputs in FIGS. 3, 4 AND 14, the compiler builds the naming table shown in FIG. 13. In this example, each entry location in the naming table had only one template listed. In a more complex example with more name binding templates as input, it is likely that one or more of the entries in the naming table would have a list of name binding templates or, more precisely, a list of pointers to name binding templates.

In FIG. 7B, the compiler proceeds from operation 110 to operation 100. Operation 100 goes after the next name binding template, but there are no more templates in the example. Therefore, decision operation 92, in FIG. 7A, detects no more name bindings, and the process returns to FIG. 2. In FIG. 2, the next basic operation 66 is to output the naming table to the CMIP infrastructure. The details of operation 66 are shown in FIG. 11.

Figure 11:
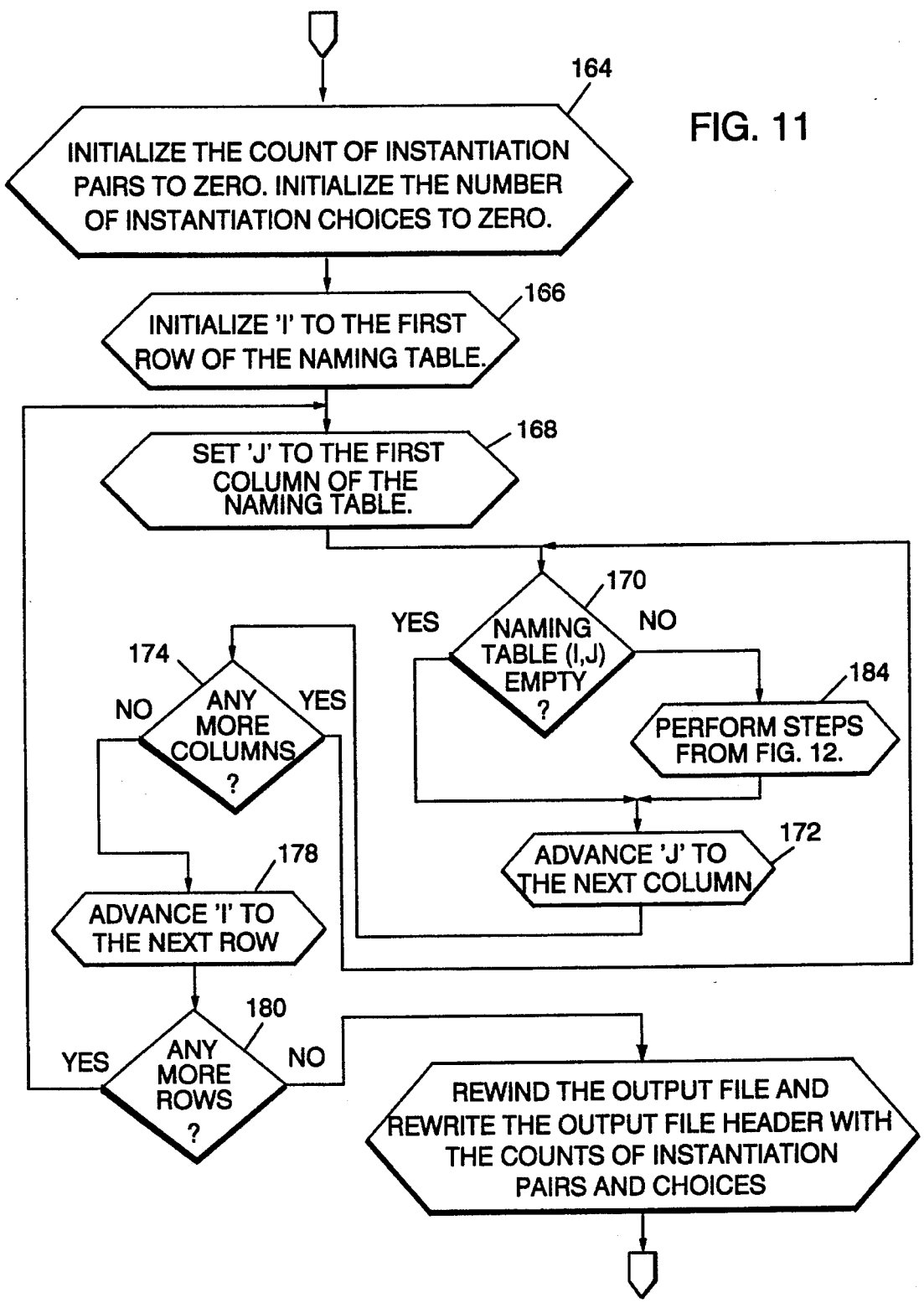
FIG. 11 illustrates the process performed in outputting the naming table to the using program as called for by operation 66 in FIG. 2.

The objective of FIG. 11 is to output the naming table as a sparse table file, and to output the file in a manner easy to load in the using program. The naming table in FIG. 13 contains many locations that have no entries or lists. The process in FIG. 11 strips out the no entry locations, and only outputs naming table locations that contain lists of name binding templates. The process in FIG. 11 also uses counting operations, and tells the using program the space required to store the file so as to ease loading of the file in the using program.

In FIG. 11, the compiler starts at operation 164 by initializing the count of instantiation pairs to zero, and initializing the number of instantiation choices to zero. Instantiation pairs are the number of non-empty entries in the naming table of FIG. 13. Instantiation choices are the total number of template choices listed throughout the naming table. In the example of FIG. 13, the number of pairs, and number of choices, is the same as there is one choice per entry in the naming table. If an entry has more than one choice of templates listed at one or more entries in the naming table, then the number of choices is greater than the number of pairs.

The process in FIG. 11 indexes through the naming table to find non-empty entries. "I" is used to index through the rows, and "J" is used to index through the columns. When an entry is found containing a list of name binding templates, that entry is converted to data for the output file. Operation 166 sets the index "I" to the first row, TOP in the example. Operation 168 sets J to the first column which is also TOP.

The loop for indexing through columns begins with decision operation 170. Operation 170 tests whether the entry at TOP/TOP is empty. If it is, the process branches to operation 172, which indexes J to the next column; i.e., class A. Decision operation 174 then tests whether operation 174 found a next column. Since it did, the process returns to decision 170. This J indexing loop continues until an entry in the TOP row is found that is not empty, or until the entire TOP row is scanned. Since there are no entries in the naming table of FIG. 13 for the TOP row, decision 174 will branch NO after the ROOT column.

From the NO branch of decision 174, the compiler executes step 178 to index "I" to the next row which is class A. Decision 180 checks to see that operation 178 did find a next row. Since it did, the process returns to operation 168 to reset J to the first column again. Decision operation 170 then detects whether the entry at location A/TOP in the naming table is empty. Since it is empty, J is advanced by operation 172 to the next column which is A. The I and J loops continue to be indexed until the first entry in the naming table is found.

When entry location A/ROOT is reached, decision 170 branches NO to operation 184. Operation 184 processes the entry at location A/ROOT to create a tagged entry in the naming output file for the entry in the naming tree. The details of operation 184 are shown in FIG. 12.

Figure 12:
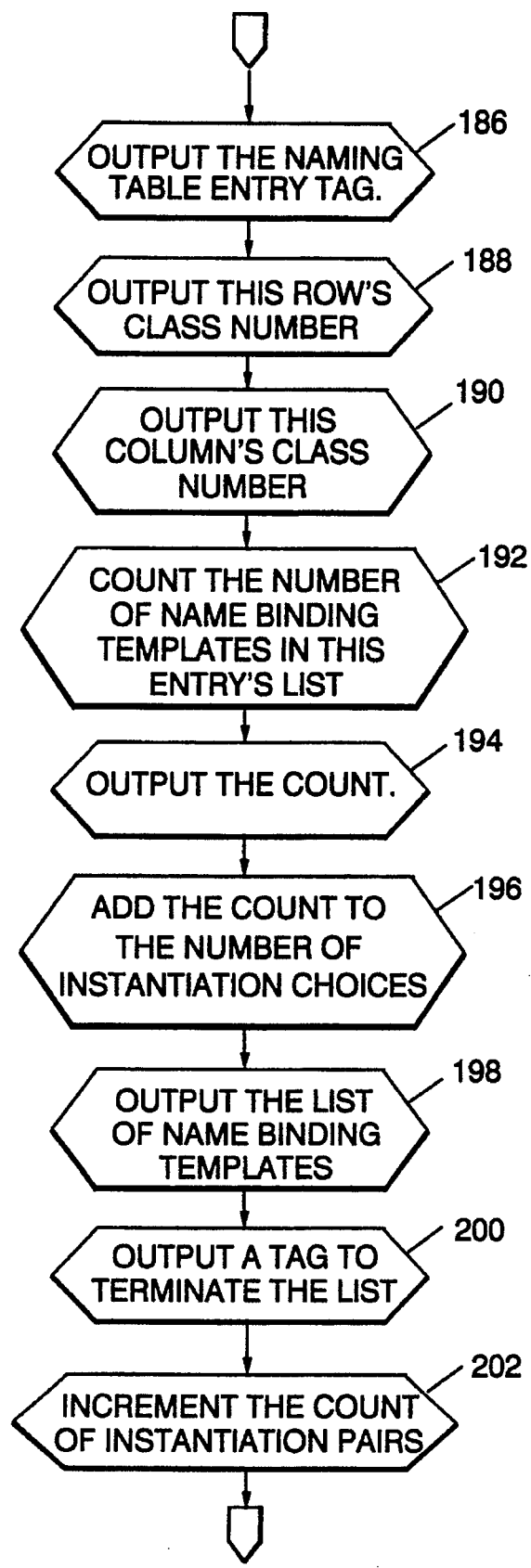
FIG. 12 illustrates the details of converting an entry in the naming table into an output data line in the naming output file.

The subroutine in FIG. 12 creates one line data in the naming output file for each non-empty entry in the naming table. At step 186 in FIG. 12, the compiler tags the line of data with a flag that indicates the line is a naming table entry. Operations 188 and 190 then output the class row and class column identifier to identify the location of the entry in the naming table. Next, in operation 192, the number of name binding templates in the list at the entry is counted. Operation 194 outputs this template count for the list, and operation 196 adds this count to the number of instantiation choices.

Operation 198 outputs the list of name binding templates to the line of data in the naming output file. The list and the end of the data line for the naming table entry is tagged in operation 200. The entry output process concludes in step 202 by incrementing the count of instantiation pairs by one. After operation 202, the process returns to the process in FIG. 11. "I" and "J" continue to be indexed until the next entry in the naming table is found. After the naming table is completely scanned, decision 174 will detect no more columns, and decision 180 will detect no more rows. The process branches to operation 204.

Operation 204 rewinds the output file and rewrites the naming output file header with the counts of instantiation pairs and choices. This will tell the programming using the naming output file how much storage space it must allocate to store the file. The naming output file is now complete, as it contains an updated header and a tagged entry with the information for each entry in the naming table.

A program, such as the CMIP infrastructure, can now use the naming output file to quickly choose among instantiation choices when creating an managed object instance. For example, if the CMIP infrastructure received a request to create a class M instance, the CMIP program accesses the naming output file. Looking at the naming table in FIG. 13 (equivalent of accessing the naming output file), the CMIP program can choose to instantiate an M class instance (1) under the ROOT object, using the nb-ROOT-A name binding template, (2) under an instance of class A using the nb-A-B name binding template, or (3) under an instance of class M using the nb-A-B name-binding template. The CMIP program would make a choice based on other information; for example, additional attributes in the name binding templates, or information in the actual instances of choice.

The invention has been embodied in the environment of providing a naming table to the CMIP infrastructure. However, the naming table could be used by any program that needs to know the information in the GDMO naming structure. While a number of preferred embodiments of the invention have been shown and described, it will be appreciated by one skilled in the art, that a number of further variations or modifications may be made without departing from the spirit and scope of our invention.

What is claimed is:

1. In a computing system having managed object instances running on the system, a method for compiling a naming table from managed object class hierarchy and from name binding templates for use by programs on the system to instantiate managed object instances, said method comprising the computer implemented steps of:

first building an inheritance table from the managed object class hierarchy, the inheritance table having an equal number of rows and columns corresponding to the number of managed object classes, with each addressable entry in the inheritance table including a symbol indicating whether or not a managed object class identified by an entry address inherits from another managed object class also identified by an entry address; and second building the naming table from the inheritance table and the name binding templates, the naming table having an equal number of rows and columns corresponding to the number of managed object classes, each addressable entry in the naming table including a list of name binding templates useable to instantiate a managed object instance of a class identified by the entry's address under another managed object instance also identified by the entry's address.

2. The method of claim 1 wherein said second building step comprises the steps of:

detecting the superior class and the subordinate class from each name binding template; and adding an entry in the naming table for each name binding template at the address specified by the superior class and the subordinate class for that name binding template, thereby indicating that instances of the subordinate class can be named under instances of the superior class.

3. The method of claim 2 wherein second building step further comprises the steps of:

detecting an AND SUBCLASSES attribute in the name binding template for the superior class, the subordinate class or both as specified by each name binding template; and adding an entry in the naming table for each detected AND SUBCLASSES inheritance as determined from the inheritance table at the address specified by the inheritance table.

4. The method of claim 1 wherein said first building step further comprises the steps of:

initializing the inheritance table as a row and column table with each of the managed object classes assigned to a column and the columns arranged from right to left in highest to lowest hierarchy and with each of the managed object classes also assigned to a row and the rows arranged from top to bottom in highest to lowest hierarchy;

setting each row/column address entry of the inheritance table to indicate whether the managed object class of the row inherits from the managed object class of the column.

5. The method of claim 4 wherein said second building step further comprises the steps of:

initializing the naming table as row and column table with each of the managed object classes assigned to a column and the columns arranged from right to left in highest to lowest hierarchy and with each of the managed object classes also assigned to a row and the rows arranged from top to bottom in highest to lowest hierarchy;

detecting the superior class and the subordinate class from each name binding template; and adding an entry in the naming table for each name binding template at the row/column address specified by the superior class and the subordinate class for that name binding template, thereby indicating that instances of the subordinate class can be named under instances of the superior class.

6. The method of claim 5 wherein said second building step further comprises the steps of:

testing whether each name binding template has an AND SUBCLASSES attribute for a superior class in the hierarchy, a subordinate class in the hierarchy or both superior and subordinate classes in the hierarchy;

if the AND SUBCLASSES attribute in the name binding template includes only the subordinate class, detecting from the inheritance table all subclasses that inherit from the template's subordinate class and listing the template at the row/column address in the naming table of each detected subclass and the template's superior class to indicate that the detected subclass of the subordinate class may be instantiated under the superior class;

if the AND SUBCLASSES attribute in the name binding template includes only the superior class, detecting from the inheritance table all subclasses that inherit from the template's superior class and listing the template at the row/column address in the naming table of the template's subordinate class and each detected subclass to indicate that the subordinate class may be instantiated under detected subclasses of the superior class;

if the AND SUBCLASS attribute in the name binding template includes both the superior and subordinate classes, detecting from the inheritance table all subclasses that inherit from either the template's superior class or the template's subordinate class and listing the template at the row/column address in the naming table of each detected subclass of the template's subordinate class and subclasses of the template's superior class to indicate that subclasses of the subordinate class may be instantiated under the superior class or the superior class's subclass.

7. The method of claim 1, wherein said managed object class hierarchy comprises managed object classes and directory object classes.

8. The method of claim 1, further comprising the step of transforming said naming table into a naming output file which is computer readable.

9. The method of claim 8, wherein transforming said naming table into a naming output file which is computer readable further comprises the steps of:

locating in the naming table a non-empty addressable entry containing said list of name binding templates;

reserving a data line in the naming output file for data to be written, and creating a tagged entry in said data line of the naming output file indicating that said data line contains name binding templates from said naming table;

writing in the naming output file a class row identifier from the naming table and a class column identifier from the naming table, thereby identifying in the naming output file the location of said non-empty addressable entry in the naming table;

writing in said data line of the naming output file said list of name binding templates of said non-empty addressable entry; and marking as complete said data line of the naming output file, and repeating the previous steps until the last non-empty addressable entry of the naming table is located and represented in the naming output file.

10. The method of claim 9, further comprising the steps of:

maintaining a count of the number of instantiation pairs, initializing said count of the number of instantiation pairs to zero;

maintaining a count of the number of instantiation choices, initializing said count of the number of instantiation choices to zero;

counting the number of name binding templates in said list of name binding templates at the location of said non-empty addressable entry in the naming table, adding said number of name binding templates to said count of the number of instantiation choices;

incrementing said count of the number of instantiation pairs for each said non-empty addressable entry in the naming table; and writing to the naming output file a file header containing said count of the number of instantiation pairs and said count of the number of instantiation choices.

11. The method of claim 9, wherein said naming output file generated is a sparse array table file.

12. In a computing system having application programs processing requests for managed object instances, a method for converting a naming table file into a computer readable file, said naming table file having non-empty addressable entries containing a list of name binding templates, the method comprising the computer implemented steps of:

locating in the naming table a first of said non-empty addressable entries containing said list of name binding templates;

reserving a data line in the naming output file for data to be written, and creating a tagged entry in said data line of the naming output file indicating that said data line contains said list of name binding templates from said naming table;

writing in the naming output file a class row identifier from the naming table and a class column identifier from the naming table, thereby identifying in the naming output file the location of said first of said non-empty addressable entries in the naming table;

writing in said data line of the naming output file said list of name binding templates of said first of said non-empty addressable entries; and marking as complete said data line of the naming output file, and repeating the previous steps until the last of said non-empty addressable entries of the naming table is located and represented in the naming output file.

13. The method of claim 12, further comprising the steps of:

maintaining a count of the number of instantiation pairs, initializing said count of the number of instantiation pairs to zero;

maintaining a count of the number of instantiation choices, initializing said count of the number of instantiation choices to zero;

counting the number of name binding templates in said list of name binding templates at the location of said non-empty addressable entry in the naming table, adding said number of name binding templates to said count of the number of instantiation choices;

incrementing said count of the number of instantiation pairs for each said non-empty addressable entry in the naming table; and writing to the naming output file a file header containing said count of the number of instantiation pairs and said count of the number of instantiation choices.

* * * * *